United States Patent
Szuba et al.

(10) Patent No.: US 6,325,578 B1
(45) Date of Patent: Dec. 4, 2001

(54) METHOD OF ERROR COMPENSATION FOR ANGULAR ERRORS IN MACHINING (DROOP COMPENSATION)

(75) Inventors: Philip S. Szuba, Clinton Township; Zbigniew Jan Pasek, Ann Arbor, both of MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/763,079
(22) PCT Filed: Aug. 17, 1999
(86) PCT No.: PCT/US99/18634
  § 371 Date: Feb. 16, 2001
  § 102(e) Date: Feb. 16, 2001
(87) PCT Pub. No.: WO00/10768
  PCT Pub. Date: Mar. 2, 2000

Related U.S. Application Data
(60) Provisional application No. 60/096,948, filed on Aug. 18, 1998.

(51) Int. Cl.[7] ............................................. B23Q 5/36
(52) U.S. Cl. ............................ 409/238; 408/13; 408/234
(58) Field of Search .................. 408/13, 16, 88, 408/234, 236, 237; 409/185, 190, 235, 238, 239, 191

(56) References Cited

U.S. PATENT DOCUMENTS

| Re. 29,633 | 5/1978 | MacMillan . |
| 2,224,108 | * 12/1940 | Ridgway ............................ 409/191 |
| 2,564,180 | 8/1951 | Turrettini . |
| 2,901,947 | 9/1959 | Waninger et al. . |
| 2,983,159 | 5/1961 | Zeligowsky et al. . |
| 3,055,224 | 9/1962 | MacGeorge . |
| 3,129,641 | 4/1964 | Walter . |
| 3,425,304 | 2/1969 | Beisswenger . |
| 3,554,046 | 1/1971 | Kirk . |
| 3,943,844 | 3/1976 | Stanbridge et al. . |

* cited by examiner

*Primary Examiner*—Daniel W. Howell
(74) *Attorney, Agent, or Firm*—Reising, Ethington, Barnes, Kisselle, Learman & McCulloch, P.C.

(57) ABSTRACT

Plural spaced actuators mounted along a first axis are used to control machine tool motion along a first axis. The plural actuators are used in synchronism to create linear motion of the machine tool and the tool tip mounted on the machine tool along the first axis. The plural actuators are used differentially to create angular motion of the tool tip about an axis which is orthogonal to the first axis in order to correct angular errors in the axis of the tool.

15 Claims, 4 Drawing Sheets

LDE

ROLL

PITCH

YAW

HORIZONTAL STRAIGHTNESS

VERTICAL STRAIGHTNESS

METHOD OF ERROR COMPENSATION FOR ANGULAR ERRORS IN MACHINING (DROOP COMPENSATION)

This application is a371 of PCT/US 99/18634 filed Aug. 17, 1999 which claims benefit of Provisional No. 60/096,948 filed Aug. 18, 1998.

This invention is made with United States Government Support under Cooperative Agreement No. 70NANB5H1158 awarded by NIST. The United States Government has certain rights in this invention.

The invention relates to the use of plural actuators to position a machine tool along a single axis whereby the machine tool may be more accurately located at a desired location.

BACKGROUND OF THE INVENTION

During any machining process, relative motion between the cutting tool and part must occur. In the ideal working condition, the machine tool moves to the position commanded by the machine tool controller and the machining operation commences.

The machining operation is associated with several sources of error. First, the platen carrying the cutting tool may not move to the desired position in the direction of motion due to a difference between the actual and commanded position. This difference is called linear displacement error (LDE). Second, the machine surfaces may not be completely flat, resulting in linear error motions in the two lateral directions; such errors are called horizontal and vertical flatness or straightness errors. In addition, inaccuracies in the manufacture and assembly of the components may cause unintended rotary motions about each machine axis; such rotary motions are called roll, pitch, and yaw.

More often than not, effects of these errors do not completely cancel each other out, and their net effect will generate errors in machined features. If sufficient degrees of freedom are available, all the errors can be minimized or eliminated. However, in most machine tools, the available degrees of freedom are usually limited to three. For example, in a single axis machine tool, there is only one degree of freedom in the feed direction. Therefore, only linear displacement error motions in the direction of feed can be corrected.

Pitch and yaw are the major sources of error at the cutting insert when using long tools. The pitch error can be caused by deformation of the machine structure due to gravity, geometric errors in the components and assembly of the machine tool, and thermally induced strains due to ambient temperature changes. It is not possible to compensate for pitch and yaw errors on traditional three axis machine tools unless additional rotary axes are added to the machine.

Because geometric errors are a function of the mechanical components of the machine tool, they can usually be altered by mechanical intervention. Various techniques exist for reducing the angular errors associated with a machine tool; however, they are time consuming to execute and very laborious. In the case of errors due to gravity, there is no easy method to correct for such errors on hee axis machine tools that have only one actuator per axis. Gravity induced errors are predominantly in the Y direction, and such "droop" errors have a large effect on the pitch of the Z-axis in the YZ plane.

SUMMARY AND OBJECTS OF THE INVENTION

Machine tool accuracy can be compromised by errors induced by gravity or by geometric inaccuracies in the structure of the machine tool itself. Compensation for such errors can be generated by using multiple drives to actuate the tool rather than a single drive. Differential control of the multiple drives can be used to introduce an intended variance in tool position, which is opposite to, and therefore cancels out, any gravity, or geometric structure related errors.

It is accordingly an object of the invention to generate more degrees of freedom in a single axis machine tool to compensate for errors by employing multiple linear actuators in place of a single drive.

It is another object of the invention to generate an extra degree of freedom in a single axis machine tool to compensate for errors by employing two ballscrew actuators.

It is another object of the invention to generate an extra degree of rotational motion in order to compensate for errors by creating differential linear motion between two ballscrews on the Y axis of a machine tool.

It is yet another object of the invention to use two actuators on the same axis of a machine tool to generate both linear and rotary motion in order to compensate for positional errors of the tool.

DESCRIPTION OF THE PREFERRED EMBODIMENT

Figure 1:
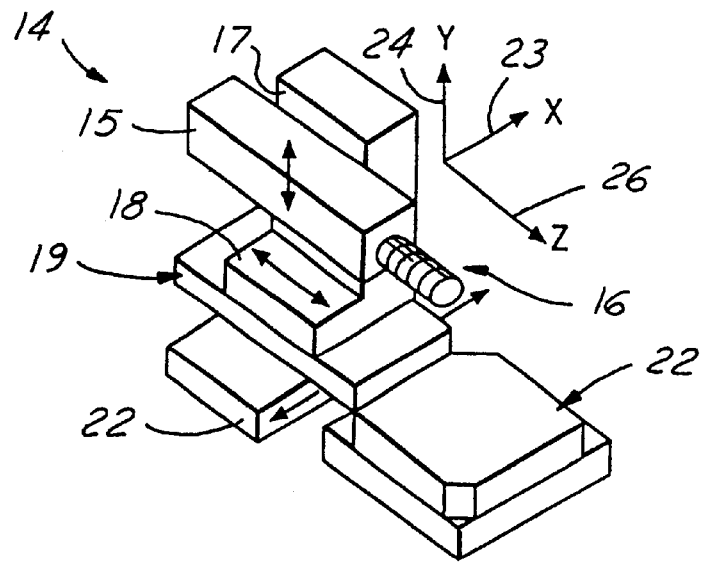
FIG. 1 shows a typical machine tool and worktable setup.

FIG. 1 shows the typical elements of a machine tool 14 which is set up to perform a boring operation. The machine tool comprises a spindle 15 which supports a cutting tool 16. The spindle 15 is mounted on a column 17 by a vertical slide and the base 18 of the column is mounted for axial movement relative to a support 19. The support 19 is mounted on a lateral slide 21. The machine tool includes a worktable 22 which normally supports a workpiece (not shown). The X-axis 23 defines lateral motion of the cutting tool, the Y-axis 24 defines vertical motion of the cutting tool, and the Z-axis 26 defines axial motion of the cutting tool 16 in the feed direction.

Figure 2A:
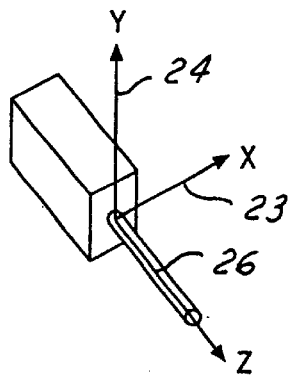
FIGS. 2A–2G show a machine tool coordinate system and the six basic errors which exist for a single axis machine tool.
Figure 2B:
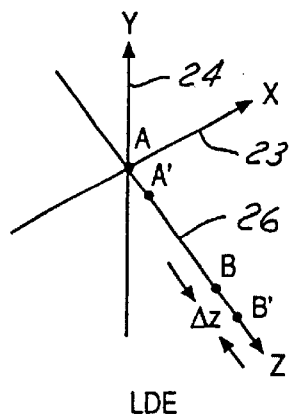
Figure 2C:
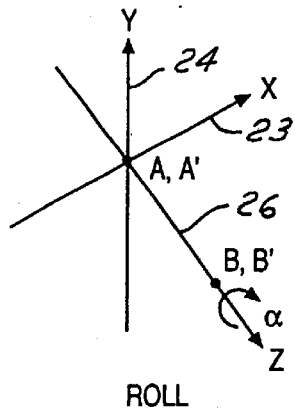
Figure 2D:
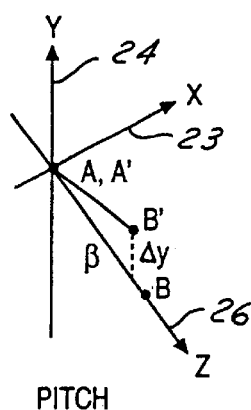
Figure 2E:
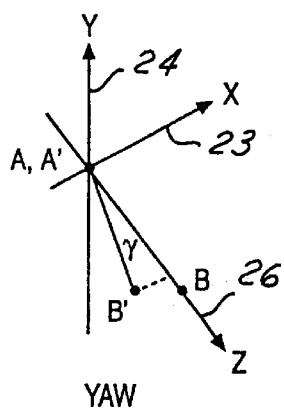
Figure 2F:
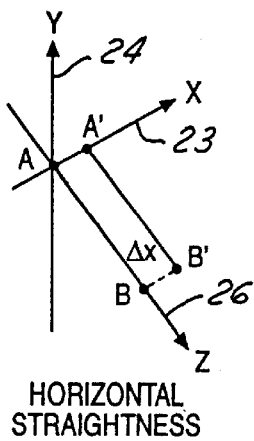
Figure 2G:
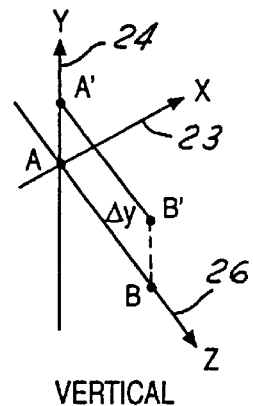

FIG. 2A defines the X axis 23, Y axis 24, and Z axis 26 of a typical machine tool where the direction of feed of the spindle 15 and the tool 16 is along the Z axis. FIGS. 2B–2G show the six error terms for the Z-axis motion of a single axis machine tool. Specifically, FIG. 2B shows Linear Displacement Error (LDE) 31 as an error $\Delta Z$ along the Z-axis 26. FIG. 2C shows Roll as rotational error 32 about the Z-axis 26. FIG. 2D shows Pitch 33 as rotational error about the X axis 23. FIG. 2E shows Yaw 34 as rotational error about the Y-axis 24. FIG. 2F shows Horizontal Straightness error 35 as error motion along the X axis 23. FIG. 2G shows Vertical Straightness error 36 as error motion along the Y axis 24.

Error measurement of the complete machine tool is rather complex since for a three axis machine, twenty-one error terms exist. These twenty errors are comprised of six error terms for each linear axis as illustrated in FIG. 2, plus three error terms relating to the squareness of the three axes with respect to each other (XY), (XZ), and (YZ). As a general manufacturing practice, if the function of the platen is to carry the workpiece, these errors are measured with respect to a nominal cutting tool position. If the function of the platen is to carry the cutting tool, measurements are made with respect to a nominal workpiece position.

Figure 3:
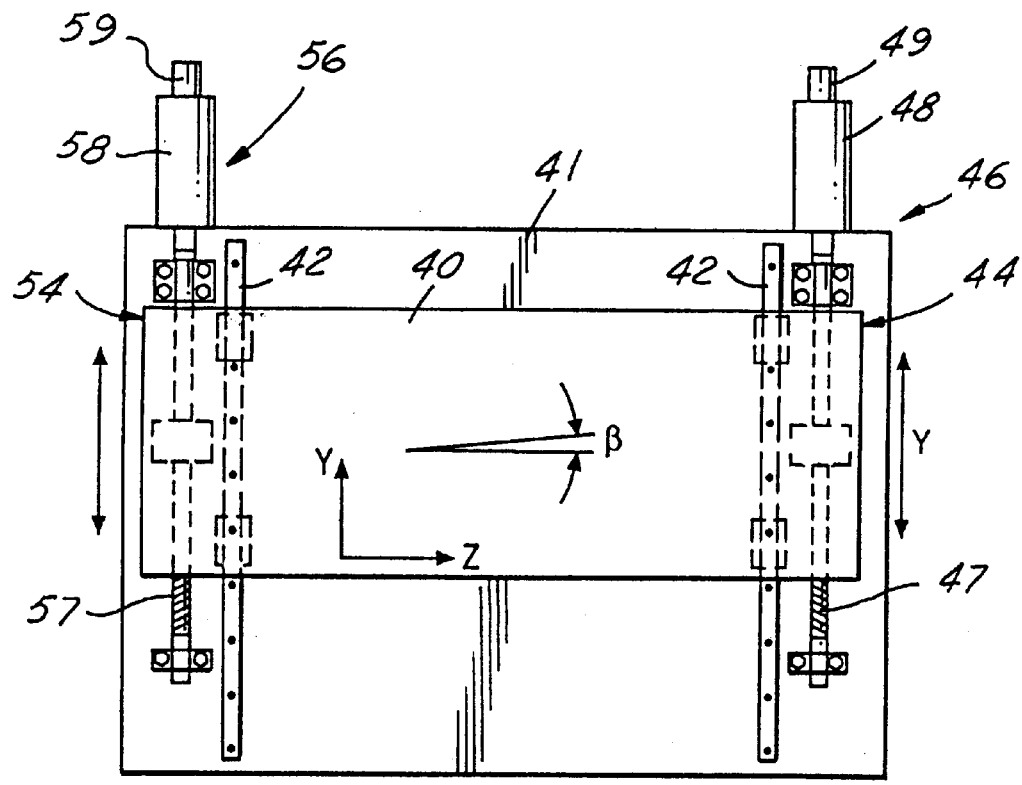
FIG. 3 shows the use of two linear actuators to control the motion of a machine tool platen.

FIG. 3 shows a platen 40 mounted on a column 41 by two ways 42. A first end 44 of the platen is coupled to a first ballscrew actuator 46 comprising a first ballscrew 47, a first motor 48, and a first encoder 49. The second end 54 of the platen is coupled to a second ballscrew actuator 56 comprising a second ballscrew 57, a second motor 58, and a second encoder 59. The two ballscrews 47 and 57may be driven in unison to provide equal displacement of the first and second ends 44 and 54 of the platen 40, or may be driven differentially to create an angular tilt β in the platen as shown.

Figure 4:
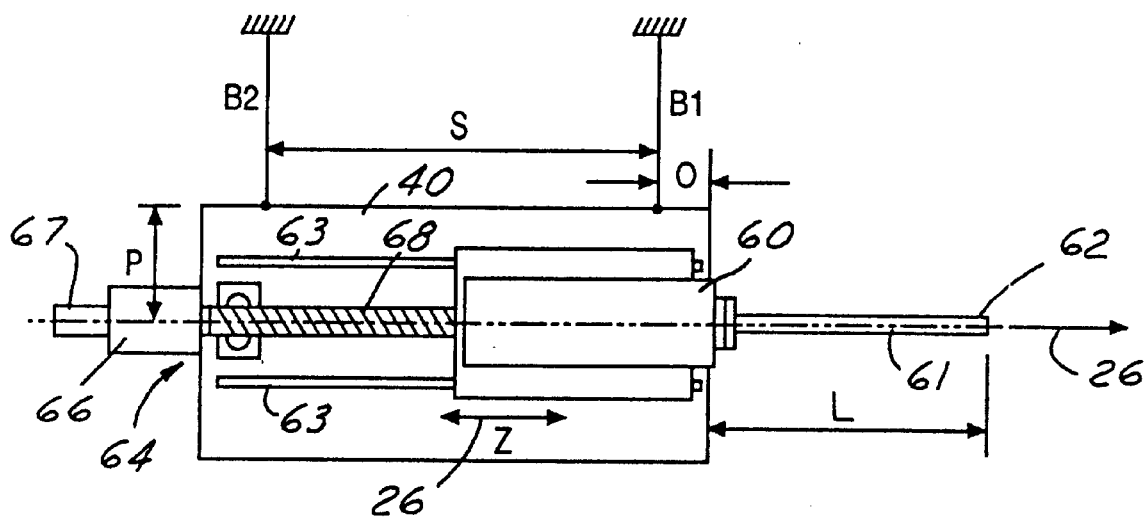
FIG. 4 shows a machine tool spindle mounted on a platen actuated by two ballscrews.
Figure 5:
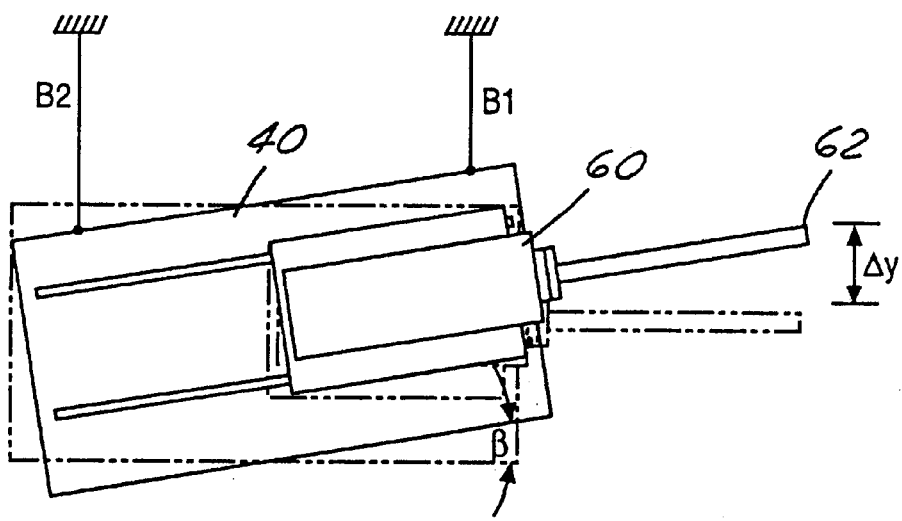
FIG. 5 shows the angular error which can be created by a mismatch in ballscrew length.

FIG. 4 shows the platen 40 of FIG. 3 with a spindle 60 and a rotary tool 61 having a cutting insert 62 mounted thereon. The spindle 60 is mounted on a pair of ways 63 for motion along the Z axis 26. A ballscrew actuator 64 comprising a motor 66, an encoder 67, and a ballscrew 68 drive the spindle 60 to the desired position along the Z axis 26. The dual ballscrew drives of FIG. 3 are represented schematically in FIG. 4 by the reference letters B1 and B2, and are separated from one another by the distance S. The variables B1 and B2 represent the ball screw lengths. When B1 is not equal to B2, an angular error, β, is introduced as shown in FIGS. 3 and 5. This angular error translates to a linear error, ΔY, at the cutting tip.

This dual drive system can be effectively used for correcting error due to pitch, as well as linear errors in the Y direction. The pitch error results in a magnified linear error ΔY in the Y direction at the tool tip 62 due to the amplification through the boring bar length. If an angular pitch error β is present, the platen 40 carrying the tool 61 can be rotated in the opposite direction through this angle by creating a differential motion between the two ballscrews B1 and B2. If a linear error is ΔY is due to an error in vertical straightness, the two ends 44 and 54 of the platen 40 can be displaced equal amounts by the ballscrews 47 and 57 to correct the linear error.

Ballscrews are typically manufactured with a constant pitch p. When installed on the machine tool, each ballscrew is rotated by a servomotor with an attached rotary encoder that has a resolution e. The encoder functions to provide closed loop feedback of position to the servomotor controller in a manner which is well known in the art.

The linear motion d generated by a ballscrew subjected to n turns is equal to:

$$d = np \quad \text{(Eqn. 1)}$$

where:
d=the resultant linear motion
n=the number of turns applied to the screw
p=the pitch of the ballscrew.

The degree of resolution which can be obtained depends on the type of encoder which is used on the ballscrew. Commercially available digital encoders have a resolution in excess of one million divisions per revolution, while analog encoders typically have a resolution of 64,000 divisions per revolution. The minimum amount of linear motion $d_{min}$ (resolution) which can be generated by a servomotor actuated ballscrew is equal to:

$$d_{min} = p/e \quad \text{(Eqn 2)}$$

For example, a 20 mm pitch ballscrew with an analog encoder that has 64,000 divisions has a resolution e of 20 mm divided by 64,000 or 0.0003125 mm.

When two ballscrews are used to move a machine tool along a common axis, as in FIGS. 3–5, incremental differences in ballscrew motion produce an angular motion in the moving platen. For the purposes of the instant invention, it is assumed that all incremental differences in ballscrew length will be small and the resultant angle generated will be very small. In terms of the known geometry of the machine tool, the value of the angular error β is:

$$\beta = \operatorname{atan}\left(\frac{B2 - B1}{S}\right) \quad \text{(Eqn 3)}$$

The resultant motion ΔY at the tool tip is equal to:

$$\Delta Y = \frac{(B2 - B1)(S + O + L)}{S} \quad \text{(Eqn 4)}$$

The resolution of a boring machine using dual ballscrews as shown in FIG. 4 can be computed as follows. In this example, the distance, S, between the two baliscrews B1 and B2 is 1600.0 mm, the distance O between B1 and the end gage line of the spindle 60 is 100.0 mm, and the length L of the boring bar is 1016.0 mm. The ballscrews have a 20 mm pitch and the servomotors have an analog encoder that contains 64,000 divisions. The angular resolution, ΔO, can be found using Equation 5 in which B2−B1 is computed for the least difference in length between B1 and B2 that can be generated by keeping one ballscrew fixed and rotating the other ballscrew 1 increment as measured by the encoder.

$$\Delta\beta = \operatorname{atan}\left(\frac{B2 - B1}{S}\right) = \operatorname{atan}\left(\frac{0.0003125\,\text{mm}}{1600\,\text{mm}}\right) = 2.30822\,\text{arc-sec.} \quad \text{(Eqn 5)}$$

With this resolution, the minimum linear error ΔY which can be corrected at the tool tip, can be found using Equation 4:

$$\Delta Y = \frac{0.0003125\,\text{mm}(1600.0\,\text{mm} + 100.0\,\text{mm} + 1016.0\,\text{mm})}{1600.0\,\text{mm}} = 0.00053\,\text{mm} \quad \text{(Eqn 6)}$$

To increase the precision of error compensation, two different ball screw pitches may be used, and the resolution of pitch compensation may be magnified. For example, the pitch $p^1$ of one ballscrew may be chosen to be 20 mm, and the pitch $p^2$ of the other may be 15 mm. Both baliscrews are coupled to an analog encoder with 64,000 divisions. The difference in ballscrew lengths B2−B1, which can be generated is:

$$d = \frac{p1}{e} - \frac{p2}{e} = \frac{20\,\text{mm}}{64,000} - \frac{15\,\text{mm}}{64,000} = 0.000078125\,\text{mm} \quad \text{(Eqn 7)}$$

Using the same machine parameters as in the previous example, the resolution of pitch compensation can be re-computed:

$$\Delta\beta = \operatorname{atan}\left(\frac{\frac{p1}{e} - \frac{p2}{e}}{S}\right) = \operatorname{atan}\left(\frac{0.000078125\,\text{mm}}{1600\,\text{mm}}\right) = 0.577\,\text{arc-sec.} \quad \text{(Eqn 8)}$$

With this increased resolution, the minimum linear error which can be corrected at the tool tip is:

$$\Delta Y = \frac{0.000078125\,\text{mm}(1600.0\,\text{mm} + 100.0\,\text{mm} + 1016.0\,\text{mm})}{1600.0\,\text{mm}} = 0.0001326\,\text{mm} \quad \text{(Eqn 9)}$$

The accuracy of resolution using two linear actuators as described herein is inversely proportional to the difference in the pitches of the ballscrews. Thus, the minimum error which can be corrected at the tool tip using two ballscrew pitches which differ by 25% is one fourth the minimum error which can be corrected using two ballscrews with the same pitch.

This technique could also be used with linear encoders and electronic levels as feedback devices. These feedback devices minimize the difference obtained due to temperature differences in the two ballscrews which would otherwise affect the accuracy of the system.

Figure 6:
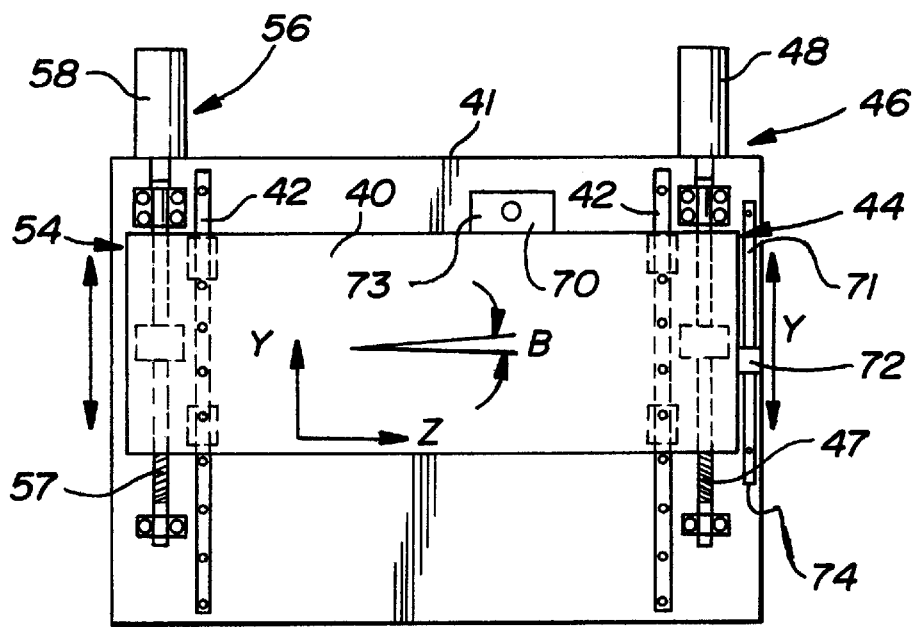
FIG. 6 shows a machine tool spindle mounted on a platen in which a linear encoder and an electronic level are used as position feedback devices.

FIG. 6 shows an embodiment of the invention in which an electronic level 70 is mounted on the platen 40, and a linear encoder 71 is mounted on the column 41. A movable sensor 72 on the linear encoder 71 is attached to the platen 40 so that movement of the platen 40 relative to the column 41 produces a signal in the linear encoder 71 which can be coupled by lead 73 to suitable processing equipment (not shown). The signal on lead 73 together with a signal on lead 74 from the electronic level 70 can be processed to develop position and error signals in a manner known in the art for the machine tool as shown in FIGS. 4 and 5 mounted on the platen.

Figure 7:
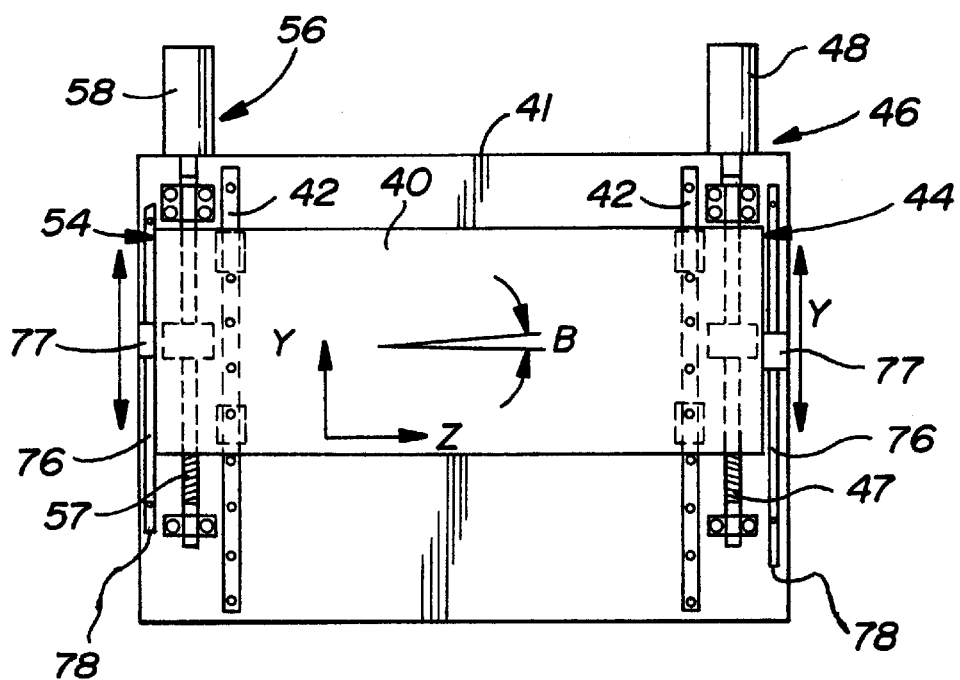
FIG. 7 shows a machine tool spindle mounted on a platen in which two linear encoders are used as position feedback devices.

FIG. 7 shows an embodiment of the invention in which two liner encoders 76 are mounted on the column 41. Each linear encoder 76 has a movable sensor 77 which is attached to the platen 40 so that movement of the platen relative to the column 41 produces a signal in the respective encoders 76 which can be coupled by leads 78 to suitable processing equipment (not shown). The signals on the two leads 78 can be processed to develop position and error signals in a manner known in the art for the machine tool as shown in FIGS. 4 and 5 mounted on the platen.

Having thus described the invention, various alteration and modification will occur to those skilled in the art, which alterations and modifications are intended to be within the scope of the invention as defined by the appended claims.

What is claimed is:

1. An error compensation system for a machine tool comprising:
    a platen on which the machine tool is mounted;
    way means for attaching the platen to a reference surface;
    drive means for moving the platen relative to the reference surface, wherein the drive means selectively moves both ends of the platen an equal or unequal amount relative to the reference surface; and
    a pair of ball screws comprising the drive means, wherein one ball screw is connected in proximity to one end of the platen and the other ball screw is connected in proximity to the other end of the platen, said ball screws being substantially parallel to said way means.

2. The error compensation system of claim 1 further comprising:
    each ball screw having the same pitch.

3. The error compensation of claim 1 further comprising:
    the two ballscrews having different pitches.

4. An error compensation system for a machine tool comprising:
    a platen on which the machine tool is mounted;
    way means for attaching the platen to a reference surface;
    drive means for moving the platen relative to the reference surface, wherein the drive means is mounted in proximity to opposite ends of the platen and selectively moves both ends of the platen an equal or an unequal amount relative to the reference surface;
    a pair of actuators comprising the drive means, wherein one actuator is connected to one end of the platen and the other actuator is connected to the other end of the platen; and
    a pair of ball screws comprising the pair of actuators, wherein the two ballscrews have different pitches.

5. An error compensation system for a machine tool having a tool oriented on a horizontal axis which compensates for pitch error of the machine tool comprising:
    a platen on which the machine tool is mounted;
    way means for attaching the platen to a reference surface;
    drive means for moving the platen vertically relative to the reference surface, wherein the drive means selectively moves both ends of the platen an equal or an unequal amount relative to the reference surface;
    a pair of ball screws comprising the drive means, wherein one ball screw is connected in proximity to one end of the platen and the other ball screw is connected in proximity to the other end of the platen; and
    said ball screws being substantially parallel to said way means.

6. The error compensation system of claim 5 further comprising:
    each ball screw having the same pitch.

7. The error compensation system of claim 5 further comprising:
    the two ballscrews having different pitches.

8. An error compensation system for a machine tool having a tool oriented on a horizontal axis, which compensates for pitch error of the machine tool comprising:
    a platen on which the machine tool is mounted;
    way means for attaching the platen to a reference surface;
    drive means for moving the platen vertically relative to the reference surface wherein the drive means selectively moves both ends of the platen an equal or an unequal amount relative to the reference surface; and
    a pair of ball screws each having a vertical axis comprising the drive means, wherein the two ballscrews have different pitches p.

9. The error compensation system of claim 5 further comprising:
    a rotary encoder attached to each ballscrew, each rotary encoder having a resolution e, whereby the minimum amount of linear motion d which can be generated by each ballscrew is equal to p/e.

10. A machine tool assembly comprising:

a machine tool mounted to a platen by a first way affixed to the platen and adjustably mounted along a first axis mounted parallel to the drive way;

a way means for attaching the platen to a reference surface;

drive means for moving the platen relative to the reference surface along a second axis perpendicular to said first axis wherein the drive means selectively moves both ends of the platen an equal or an unequal amount relative to the reference surface; and a pair of ball screws comprising the drive means, wherein one ball screw is connected in proximity to one end of the platen and the other ball screw is connected in proximity to the other end of the platen, said ball screws being substantially parallel to said way means and perpendicular to said first axis.

11. The machine tool assembly of claim 10 further comprising:

each ballscrew having the same pitch.

12. The machine tool assembly of claim 10 further comprising:

the two ballscrews having different pitches.

13. The machine tool assembly of claim 10 further comprising:

servo-motors mounted at an end of each ball screw for turning said ballscrew for moving said platen along said way means.

14. An error compensation system for a machine tool having an extended toop tip in which the machine tool is mounted on a platen for adjusting the position of the tool and the tool tip comprising:

a pair of spaced ballscrews coupled to the platen, each ballscrew having a pitch p, the ball screws being spaced from one another by a distance S;

a pair of rotary encoders coupled to each ballscrew, each encoder having a resolution, wherein the smallest linear motion which can be generated by a ballscrew is p/e;

a distance O+L between the tool tip and the ballscrew which is closest to the tool tip, in which L is the length of the tool and O is the distance between the front of the machine tool and the ballscrew which is closer to the front of the machine tool, whereby the least distance the tool tip can be moved as a result of differential actuation of the ballscrews is $$(p/e)\frac{(S+O+L)}{S}.$$

15. An error compensation system for a machine tool having an extended tool tip in which the machine tool is mounted on a platen for adjusting the position of the tool and the tool tip comprising:

a pair of spaced ballscrews coupled to the platen, the first ballscrew having a pitch p1 and the second ballscrew having a pitch p2, the ballscrews being spaced from one another by a distance S;

a pair of rotary encoders coupled to each ballscrew, each encoder having a resolution e, wherein the smallest linear motion which can be generated by the first ballscrew is p1/e and the smallest linear motion which can be generated by the second ballscrew is p2/e;

a distance O+L between the tool tip and the ballscrew which is closest to the tool tip, in which L is the length of the tool and O is the distance between the front of the machine tool and the ballscrew which is closest to the front of the machine tool, whereby the least distance the tool tip can be moved as a result of differential actuation of the ballscrews is $$\left(\frac{P^1}{e}-\frac{P^2}{e}\right)\frac{(S+O+L)}{S}.$$

* * * * *

UNITED STATES PATENT AND TRADEMARK OFFICE
CERTIFICATE OF CORRECTION

PATENT NO. : 6,325,578 B1
DATED : December 4, 2001
INVENTOR(S) : Philip S. Szuba et al.

It is certified that error appears in the above-identified patent and that said Letters Patent is hereby corrected as shown below:

<u>Column 8,</u>
Line 4, change "closer" to -- closest --.

Signed and Sealed this

Nineteenth Day of March, 2002

Attest:

JAMES E. ROGAN
*Attesting Officer*     *Director of the United States Patent and Trademark Office*